(No Model.)
A. L. MURPHY.
METHOD OF UNITING PIPE SECTIONS.
No. 376,750. Patented Jan. 24, 1888.
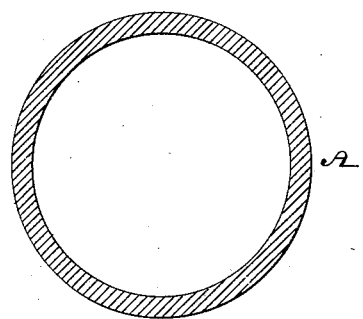
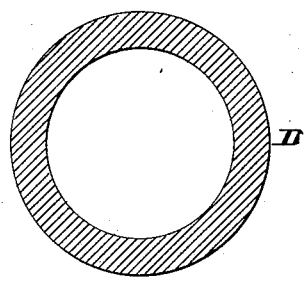
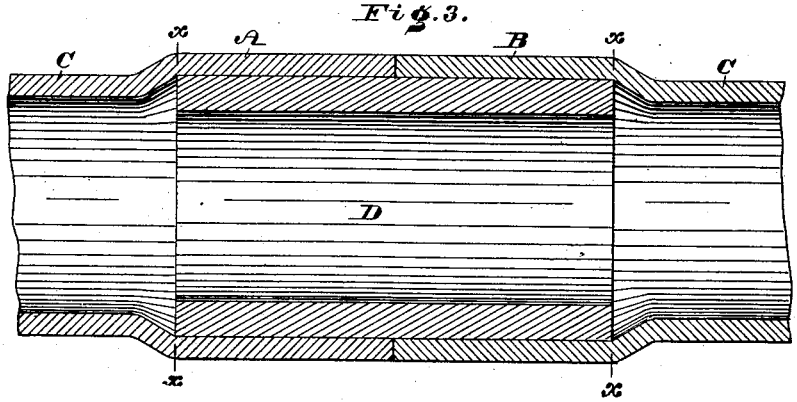
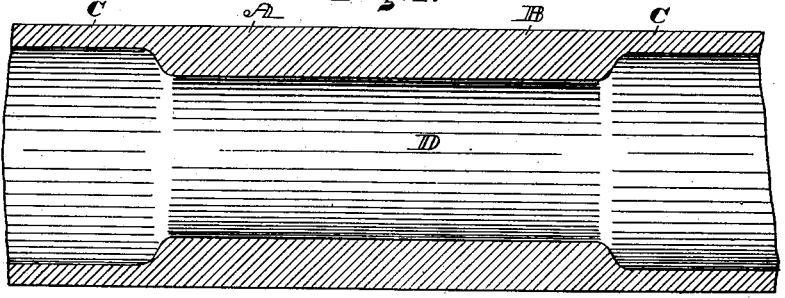
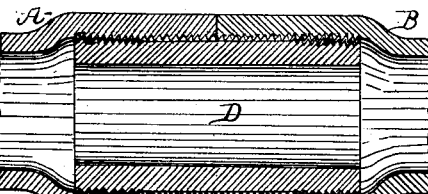
WITNESSES:
Th. Rollé
Jas. F. Kelly
INVENTOR:
A. L. Murphy
Niedersheim & Kintner
ATTORNEYS.
N. PETERS, Photo-Lithographer, Washington, D. C.

UNITED STATES PATENT OFFICE.

ALBERT L. MURPHY, OF PHILADELPHIA, PENNSYLVANIA.

METHOD OF UNITING PIPE-SECTIONS.

SPECIFICATION forming part of Letters Patent No. 376,750, dated January 24, 1888.

Application filed June 23, 1887. Serial No. 242,253. (No model.)

*To all whom it may concern:*

Be it known that I, ALBERT L. MURPHY, a citizen of the United States, residing in the city and county of Philadelphia, State of Pennsylvania, have invented a new and useful Improvement in Methods of Welding Pipes, which improvement is fully set forth in the following specification and accompanying drawings.

My invention relates to a method or process of joining together the ends of sections of pipes or tubing by welding; and to this end it consists in novel features hereinafter described, and particularly pointed out in the claims which follow this specification.

Figure 1 of the drawings is a cross-section of a hollow metal plug adapted for use in my method. Fig. 2 is a cross-section of either end of two adjoining pipes on line $x\ x$, Fig. 3. Fig. 3 is a longitudinal section of the abutting ends of two pipes with the plug located preparatory to welding. Fig. 4 is a similar section of the parts after the process of welding has been effected. Fig. 5 is a cross-section of a modified form, in which the plug D is screw-threaded to fit the similarly screw-threaded ends of the tubes to be joined.

Similar letters of reference indicate corresponding parts in the several figures.

Referring to the drawings, A and B represent the ends of two tubes or pipes, C C, to be joined, said ends being expanded.

D represents a hollow plug adapted to fit snugly into the ends A B, and is of a thickness about twice that of the tubes to be welded. The thickness of the walls of this plug depends upon the use to which the tubing is to be put. If it is designed to use the parts so joined as railing or for analogous purposes, it may be, if desired, a solid plug; but it should be of such thickness as will give stability and lightness to the parts to be joined.

If the tubing is to be used for piping, it is advisable to have the walls of plug D as thin as possible and yet afford sufficient strength for the purpose.

In carrying out my process I proceed as follows: I first enlarge or expand the diameters of the ends of the pipes C to be joined, and insert thereinto the plug D, as clearly shown in Fig. 3. I then heat the pipes to a welding temperature, after which I swage the joint in any well-known manner, thus welding the parts together and reducing the joint to the proper size, as shown in Fig. 4.

The parts A and B may, if desired, be screw-threaded, and previous to the welding process be firmly screwed together, with the plug D confined as before, as clearly shown in Fig. 5.

Having thus described my invention, what I claim as new, and desire to secure by Letters Patent, is—

1. The within-described method of uniting two pieces of iron piping or tubing, consisting in inserting an iron plug into the ends of the pipes to be united, then heating the whole to point of welding, and finally swaging the parts, substantially as described.

2. The within-described process of welding wrought-iron tubing or piping, consisting of mechanically uniting the ends of the tubing or piping about an iron plug, then heating the joint to the point of welding, and finally swaging the joint to the desired dimensions, substantially as described.

3. The within-described improvement in the art of uniting metal tubing or piping, consisting in first enlarging the diameter of the ends of the tubes or pipes to be united, then joining said enlarged ends over a metal plug, and then heating such joint to the point of welding, and finally swaging the joint to the desired dimensions, substantially as described.

4. The within-described improvement in the art of uniting hollow iron tubing or piping, consisting, first, in forcing the ends of the parts to be united over an iron plug having an exterior diameter substantially equal to that of the inner diameter of said ends, then heating the joint to the point of welding, and finally swaging the same to the desired dimensions, thus welding the parts together, substantially as described.

ALBERT L. MURPHY.

Witnesses:
A. P. JENNINGS,
JOHN A. WIEDERSHEIM.